US012091185B2

(12) United States Patent
Dibb et al.

(10) Patent No.: US 12,091,185 B2
(45) Date of Patent: Sep. 17, 2024

(54) AIR-TO-AIR REFUELLING DROGUE ASSEMBLY

(71) Applicant: Mission Systems Wimborne Limited, Dorset (GB)

(72) Inventors: Craig Dibb, Dorset (GB); Ian Monda, Dorset (GB); Richard Foxwell, Dorset (GB); Matthew Walker, Dorset (GB); Collette Haig, Dorset (GB); Georgios Papaioannou, Dorset (GB); Samuel Whitworth, Dorset (GB); Henry Clarke, Dorset (GB)

(73) Assignee: Mission Systems Wimborne Limited (GB)

( * ) Notice: Subject to any disclaimer, the term of this patent is extended or adjusted under 35 U.S.C. 154(b) by 271 days.

(21) Appl. No.: 17/216,178

(22) Filed: Mar. 29, 2021

(65) Prior Publication Data

US 2021/0300585 A1 Sep. 30, 2021

(30) Foreign Application Priority Data

Mar. 30, 2020 (GB) ...................................... 2004598

(51) Int. Cl.
 *B64D 39/04* (2006.01)
(52) U.S. Cl.
 CPC .................... *B64D 39/04* (2013.01)
(58) Field of Classification Search
 CPC ................................ B64D 39/06; B64D 39/00
 See application file for complete search history.

(56) References Cited

U.S. PATENT DOCUMENTS

| 2,199,588 | A | 5/1940 | Cobham et al. |
| 2,803,473 | A | 8/1957 | Hohmann |
| 3,475,001 | A | 10/1969 | Hieber |
| 6,604,711 | B1 | 8/2003 | Stevens et al. |
| 9,933,521 | B2 | 4/2018 | Riley et al. |
| 2009/0184205 | A1 | 7/2009 | Matheny |
| 2010/0108815 | A1 | 5/2010 | Stecko et al. |
| 2011/0052039 | A1 | 3/2011 | Urabe et al. |

(Continued)

FOREIGN PATENT DOCUMENTS

| EP | 2607237 | 6/2013 |
| EP | 2952434 | 12/2015 |

(Continued)

OTHER PUBLICATIONS

European Search Report dated Jan. 29, 2021 for EP20192330.7.

(Continued)

*Primary Examiner* — Timothy D Collins
*Assistant Examiner* — Eric Acosta
(74) *Attorney, Agent, or Firm* — Dorsey & Whitney LLP

(57) ABSTRACT

The present invention relates to the field of aerial refuelling, usually by transfer of fuel from a tanker aircraft to a receiver aircraft. In particular the invention relates to a probe and drogue assembly arrangement in which the drogue assembly is steerable to facilitate engagement with the probe of the receiver aircraft. The invention provides a steerable drogue assembly for towing behind an aircraft, the drogue assembly comprising a reception coupling for receiving a probe of a receiver aircraft, one or more aerodynamic control features and one or more actuators provided in the drogue assembly and adapted to selectively activate said one or more control features, so that an activated control feature interacts with airflow passing the drogue so as to exert a control force on the drogue.

26 Claims, 13 Drawing Sheets

(56) References Cited

U.S. PATENT DOCUMENTS

| | | |
|---|---|---|
| 2012/0168564 A1 | 7/2012 | Feldmann et al. |
| 2013/0028377 A1 | 1/2013 | Kovarik et al. |
| 2015/0293225 A1 | 10/2015 | Riley et al. |
| 2015/0344147 A1 | 12/2015 | Espinoza Sanchez et al. |
| 2017/0190440 A1 | 7/2017 | McLaughlin |
| 2017/0341735 A1 | 11/2017 | Bernhardt et al. |
| 2018/0016026 A1 | 1/2018 | Carlson et al. |
| 2018/0057021 A1 | 3/2018 | Sevey |
| 2019/0057528 A1 | 2/2019 | Black et al. |
| 2019/0272660 A1 | 9/2019 | Black et al. |
| 2021/0061493 A1 | 3/2021 | Pattison et al. |
| 2021/0188458 A1 | 6/2021 | Whitworth et al. |
| 2021/0300584 A1 | 9/2021 | Campbell et al. |

FOREIGN PATENT DOCUMENTS

| | | | |
|---|---|---|---|
| EP | 3715815 | | 9/2020 |
| FR | 2736614 A1 | | 1/1997 |
| GB | 724159 | | 2/1955 |
| GB | 2405384 | | 3/2005 |
| GB | 2418186 A | | 3/2006 |
| GB | 2454593 A | | 5/2009 |
| WO | WO-2006073468 A2 | * | 7/2006 ............. B64D 39/00 |

OTHER PUBLICATIONS

Detail Specification Sheet, Nozzle-Type MA-2, Flight Pressure Refueling, ,Apr. 18, 2016.

Military Specification, Nozzle, Aerial Pressure Refueling, Type MA-2 ,Feb. 12, 1981.

Chen Chao, et al., Drogue Tracking Using 3D Flash Lidar for Autonomous Ariel Refueling, Laser radar Technology and Applications, vol. 8037 ,2011 , 1-11.

Tanner, et al., History of Air to Air Refueling, MK XVI Air Refueling Package, ,2006.

* cited by examiner

AIR-TO-AIR REFUELLING DROGUE ASSEMBLY

RELATED APPLICATIONS

This application claims priority to United Kingdom Patent Application No. GB 2004598.5, filed on Mar. 30, 2020 and titled, "AIR-TO-AIR REFUELLING DROGUE ASSEMBLY," which is hereby incorporated by reference in its entirety.

BACKGROUND

Technical Field

The present invention relates to the field of aerial refuelling, usually by transfer of fuel from a tanker aircraft to a receiver aircraft. In particular the invention relates to a probe and drogue assembly arrangement in which the drogue assembly is steerable to facilitate engagement with the probe of the receiver aircraft.

Description of Related Art

There are two forms of aerial refuelling in widespread use; one method involves the use of a telescoping boom fixed to the rear underside of a tanker aircraft. The distal end region of the boom is typically provided with moveable control surfaces in the form of a pair of ruddervators which allow a boom operator in the tanker aircraft to fly the boom end into engagement with a receptor in the receiving aircraft. The other method of refuelling is the probe and drogue system in which the tanker aircraft reels out a trailing flexible fuel hose with a drogue assembly attached to the end. The receiver aircraft is provided with a rigid fuelling probe which the pilot of the receiving aircraft directs into engagement with a reception coupling incorporated in or attached to the drogue assembly. The drogue assembly includes a stabilising chute which is a generally cone-shaped canopy trailed from a rear end of the drogue assembly. The reception coupling is adapted to receive a free end of the receiver aircraft's probe, and to latch therewith. The coupling provides fluid communication between the hose and the probe. A variant of the flying boom method involves the use of a hose and drogue adapter, so that a hose and drogue assembly are trailed from the boom of the tanker aircraft. The receiver aircraft has a probe for engaging with a reception coupling included in the drogue assembly. The present invention is primarily concerned with probe and drogue type refuelling.

In a refuelling event the tanker aircraft trails the hose and drogue assembly during flight, whilst the receiver aircraft is piloted towards the drogue. The receiver aircraft's pilot relies purely on skill and experience to control engagement of the probe into the reception coupling. One problem is that the freely trailed drogue assembly can be easily buffeted by the airflow, making the operation difficult and stressful to complete at a time when fuel reserves may be low.

Various ways of controlling the position of the drogue assembly have been suggested, such as radial thrusters provided in an attachment to the drogue, as per U.S. Pat. No. 6,604,711. However, thrusters would be complex and heavy components. GB-A-2454593 (Flight Refuelling Ltd) discloses a steerable drogue assembly for in-flight refuelling which relies upon actuation of rotatable steering fins in the drogue chute canopy to move the drogue assembly in a desired direction. However, as the steering fins form part of the canopy they are vulnerable to impact damage from a wayward probe and buffeting in the airflow.

The present invention seeks to provide a steerable drogue assembly which is more robust than previous examples and less prone to damage and should therefore be more reliable.

Some or all of these aims (and others that will be evident to the skilled person) are met by the present invention in its various aspects, as will be evident from the following description.

SUMMARY OF THE INVENTION

According to a general aspect of the invention there is provided a steerable drogue assembly for towing behind an aircraft, the drogue assembly comprising a reception coupling for receiving a probe of a receiver aircraft, one or more aerodynamic control features and one or more actuators provided in the drogue assembly and adapted to selectively activate said one or more aerodynamic control features, so that an activated aerodynamic control feature interacts with airflow passing the drogue so as to exert a control force on the drogue.

The aerodynamic control features may include a wing member arranged to project radially from the drogue into the airflow passing the drogue.

Each wing member may include a flap member, in which the flap member is displaceable to vary the aerodynamic force on the drogue assembly.

Each wing may have a respective actuator for displacing said flap member.

The flap member may be arranged so that the aerodynamic force exerted on the drogue assembly is in a direction perpendicular to a central towing axis of the drogue assembly.

Optionally, the flap member is arranged with a pivot axis aligned with a radial direction of the drogue passing through the central towing axis of the drogue assembly so that the aerodynamic force exerted on the drogue assembly is in a direction parallel to a tangent of the surface of the drogue assembly.

The drogue assembly may include receiving basket formed from a plurality of support arms arranged annularly around the central towing axis of the drogue assembly, wherein the aerodynamic control features are moveable between a stowed position interleaved with the support arms and a deployed position projecting radially from the drogue into the airflow passing the drogue.

The aerodynamic control features may be pivotally mounted to the drogue at a first portion with a second portion moveable between a first position corresponding to the stowed position and a second position corresponding to the deployed position of the aerodynamic control feature.

Optionally, each of the support arms are also pivotable between a stowed position and a deployed position and wherein each of the support arms is provided with a free end wherein the free ends of the support arms and the second portions of the aerodynamic control features are connected to each other such that movement of the support arms causes corresponding movement of the aerodynamic control features.

The support arms and aerodynamic control features may be connected by a deployment cord connected to each of them.

Alternatively, the aerodynamic control features may each comprise a generally planar aerodynamic control surface which is oriented generally tangentially with respect to a towing axis of the drogue assembly. In this way when an activated control feature interacts with airflow passing the drogue it exerts a control force on the drogue in a generally radial direction (which is to say generally perpendicular to the plane of the aerodynamic control surface).

The aerodynamic control surface is preferably configured and oriented so that the radial direction of the control force is preferably towards the towing axis (rather than away from the axis). The drogue assembly typically has a generally cylindrical form, with a tapered leading end region.

The tangential orientation means that the control surface occupies a generally tangential plane, which lies generally parallel with respect to a central (towing) axis of the drogue. In practice a rear region of the control surface will typically be flared outwardly away from the central axis.

In one aspect of the invention the aerodynamic control features each comprise a control flap and an associated actuator which activates the flap by moving the flap from a retracted position to a deployed position in which the flap projects into the airflow over the drogue assembly so as to produce an aerodynamic force on the drogue assembly which acts to shift the drogue assembly laterally with respect to the towing axis. Each actuator is preferably associated with a counterpart control flap so that each control flap is selectively actuatable. The flaps when deployed disturb the laminar airflow over the drogue and generate turbulent drag. This results in a lateral reaction which acts towards the centre of the drogue, pushing the drogue laterally to shift the drogue away from the flap deployment side. The flap typically deploys in a radial direction.

In a preferred arrangement the actuators are each configured to move the associated control flaps to one or more intermediate positions between the retracted and fully deployed positions, whereby each control flap may be partially deployed in said one or more intermediate positions. This allows fine control of the shifting force.

In a preferred configuration the control flaps each have a leading end and a trailing end, with deployment of the flap being associated with movement of the flap trailing end radially outward with respect to the leading end. The leading end may be pivotally attached to the drogue. This may be in the form of a hinge, but could also be achieved by the use of a flexible resilient web which permits pivoting.

The control flaps may sit flush against an outer surface of the drogue assembly when in the retracted position. This reduces the likelihood of the flaps snagging or fouling external features such as the receiver probe, or the drogue's chute. The retracted flaps may be accommodated inset from the drogue assembly surface profile to further protect them from snagging.

The drogue assembly is typically provided with a plurality of control flaps, and the control flaps are arranged so as to be circumferentially spaced apart from one another around an outer circumferential surface of the coupling. This may allow steering of the drogue assembly in a desired direction. For example if the drogue assembly is provided with four flaps disposed at 0, 90, 180 and 270 degree positions, then each of the corresponding lateral directions can be selected by actuation of the appropriate flap. Combinations of flaps can provide finer control, for example by actuation of adjacent pairs of flaps.

In another aspect of the invention each aerodynamic control surface is provided by a generally planar aerofoil member. The aerofoil is preferably oriented and configured to generate lift in a radial direction towards the towing axis of the drogue. By using an aerofoil member of appropriate cross section and angle of attack considerable lift (and therefore control force) may be generated (as compared to say a simple flap as hereinbefore described).

In a preferred arrangement the aerofoil member when in an activated configuration defines an air duct between the aerofoil member and an outer surface portion of the drogue body. The air duct typically comprises an inlet at a front region of the aerofoil member and an outlet at a rear region of the aerofoil member. The duct helps maintain laminar flow over the aerofoil lifting surface.

In one structural arrangement each aerofoil member is adapted to be moveable between a retracted position in which the aerofoil member is adjacent an outer surface portion of the drogue body and a deployed activated position in which the aerofoil member is radially spaced apart from the outer surface portion with an airflow path thereby provided between the aerofoil member and the outer surface portion.

An actuator operative between the aerofoil member and the drogue body may be used to permit adjustment of an angle of attack of the aerofoil member, or adjustment of an elevator included in the aerofoil member.

The actuator (such as a mechanical linkage) may act to increase the angle of attack as the aerofoil member moves from retracted to deployed positions.

In a preferred embodiment a linkage operative between the aerofoil member and the drogue body causes an angle of attack of the aerofoil member to increase as the aerofoil member moves from retracted to deployed positions.

An actuator may be associated with the aerofoil member for moving the aerofoil member from retracted to deployed positions. This may be an electromechanical linear actuator.

In another preferred structural arrangement an air duct blocking member may be provided which is moveable between an open position in which the duct is open for airflow therethrough and a closed position in which the duct is closed.

The blocking member may comprise an annular ring member provided with one or more blocking features which may be selectively rotated brought into alignment with the duct so as to block airflow therethrough (in the closed position) and may be further rotated to permit airflow through the duct in the open position. The ring member may be coaxially disposed on or in the drogue body for selective rotation with respect to the body. The air duct blocking member may be associated with an actuator which serves to move the blocking member between said positions. This actuator may comprise a rotary threaded screw drive which acts via appropriate gearing to rotate the ring about its axis so as to open and close at least one duct.

In this arrangement each aerofoil member may be fixed with respect to the drogue body, with a spacing between the aerofoil member and the outer surface portion of the body which defines the duct. Although the aerofoil members may be fixed in position (for the sake of simplicity and robustness), the aerofoil members could be moveable, in whole or as a portion thereof. This could be done to so as to permit stowage of the aerofoil members by retraction, or so as to modify the lift characteristics, such as to provide fine control of the lift generated. So flaps or wing slots could be provided, or the entire aerofoil member could be moved to increase or decrease lift, or maintain laminar flow. This could be achieved by a rocking mount about which the aerofoil member pitches, in the manner of aircraft stabilators, or local features such as a trailing edge portion which pivots in the manner of aircraft elevators or trim tabs.

Each duct is preferably elongate and internal to the drogue body. There will typically a plurality of aerodynamic surfaces and/or associated ducts, for example four circumferentially spaced ducts at 0, 90, 180 and 270 degree positions around the drogue body. However other options include two diametrically opposed aerofoil control surfaces and/or ducts, or three, six or eight circumferentially spaced aerofoil control surface and/or ducts may be used.

The actuators useful in the present invention may be electrical, electromagnetic or pneumatic or use any other actuation means. The drogue assembly may be provided with a turbine generator. The turbine generator may be configured to harvest electrical power for electrical or electromagnetic actuator(s) from the airflow. The turbine generator may directly feed the actuators or feed an electrical storage device which powers the actuators. The electrical storage device may be a battery, capacitor or cell. Alternative actuation methods may be used, such as pneumatic or electromagnetic.

The turbine generator may comprise one or more ram air turbines (RATs). The RAT may comprise rotating air turbine blades driven by airflow. The turbine blades may be disposed for co-axial rotation along the drogue's towing axis. The turbine blades are preferably disposed in a nose region of the coupling, ahead (forward) of the aerodynamic control surfaces, such as the flaps, aerofoils or ducts. In an alternative arrangement the RAT could be mounted internally in the drogue assembly, with a ducted air inlet and exhaust. Such an internal RAT is described in U.S. Pat. No. 5,505,587A (the contents of which are incorporated herein by reference). The RAT could alternatively be mounted externally on the drogue assembly body, or on the drogue chute's ribs.

Alternatively the drogue assembly may be provided with no generator and may have batteries, a cell or capacitor which are stand-alone pre-charged devices. In yet another alternative, the actuator(s) in the drogue assembly, or the electrical storage devices, may be powered (or recharged) remotely via a power cable fed to the coupling along a fuel hose from the donor/tanker aircraft.

The drogue assembly may be provided with a control system for controlling the activation of the aerodynamic control surfaces in response to control signals. The control signals may be provided remotely, such as from the receiver aircraft or from the towing aircraft. The control system may be adapted to receive feedback signals from one or more position or proximity sensor provided in or on the drogue assembly. In either case aircrew may instigate or actuate the control signals so as to manually steer the drogue. Alternatively a drogue guidance system could be utilised automatically to steer the drogue assembly. The drogue assembly's lateral motion may be controlled from the receiver aircraft, or from the donor/tanker aircraft, or may respond to a self-contained guidance and sensor system provided within the drogue assembly.

In preferred embodiments the drogue in accordance with the invention is used for air-to-air refuelling. In this case a fuel hose fed out (typically spooled) from a tanker aircraft serves to tow the drogue assembly. The reception coupling of the drogue assembly is then adapted to engage and latch with the refuelling probe of the receiver aircraft so as to permit refuelling via the hose, coupling and probe.

In a further aspect of the invention there is provided an aerial refuelling tanker aircraft provided with a drogue assembly as hereinbefore described.

In yet another aspect of the invention there is provided a hose and drogue refuelling system comprising a fuel hose and hose deployment mechanism and a drogue assembly as hereinbefore described, the system being housed in to a pod to be fitted to an aircraft, especially a tanker aircraft.

In typical embodiments the drogue assembly will include a drogue chute attached to a rear region of the drogue body.

The use of a steerable drogue assembly of the present invention facilitates the engagement between drogue-towing aircraft and receiver aircraft by use of the steerable drogue assembly, making the process more efficient. This can be used to reduce the workload for the pilot of the receiver aircraft, and to reduce the time spent for each refuelling event.

BRIEF DESCRIPTION OF THE DRAWINGS

Following is a description by way of example only and with reference to the accompanying drawings of various modes for putting the present invention into effect.

In the drawings.

DETAILED DESCRIPTION OF EMBODIMENTS

First Embodiment

Figure 1:
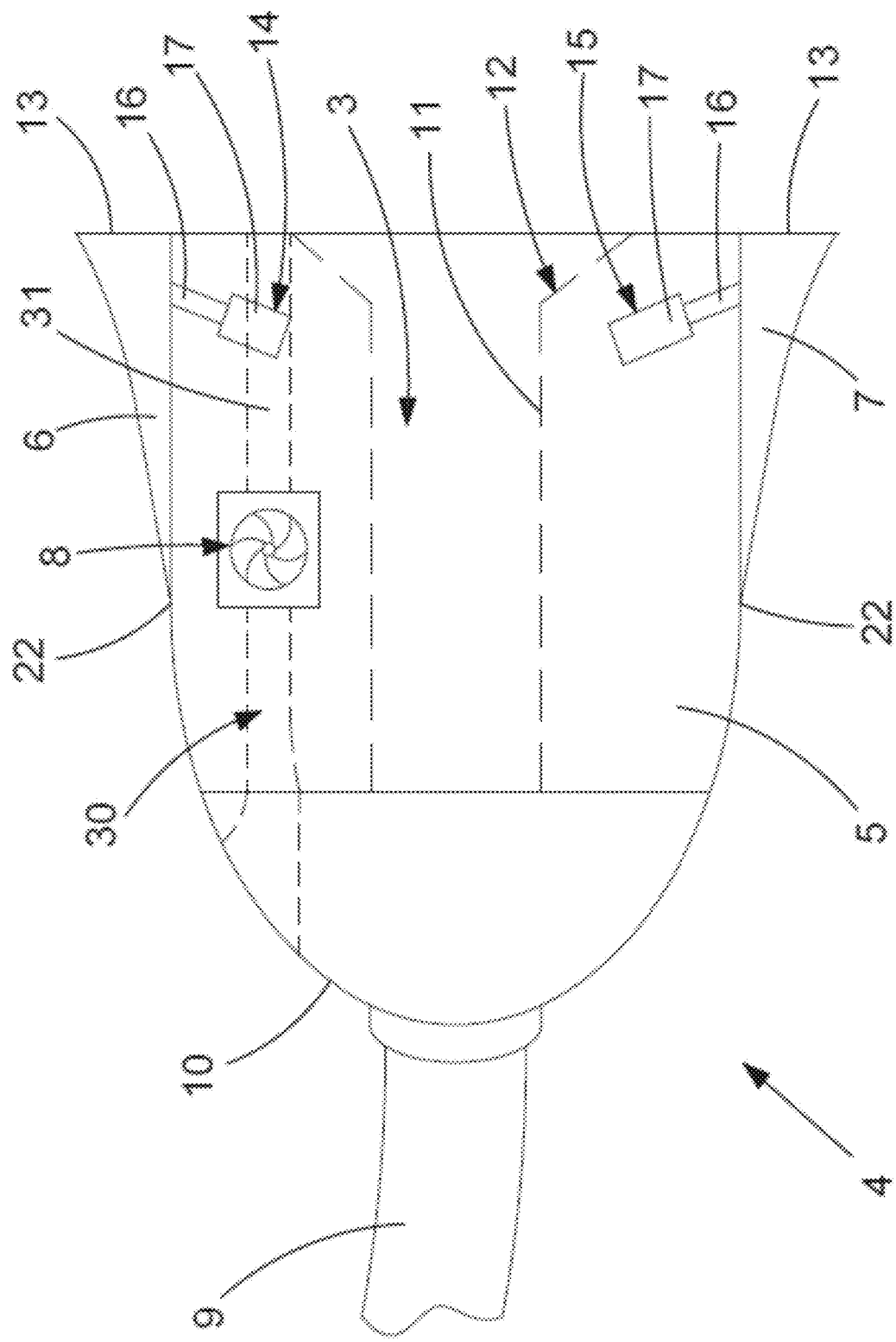
FIG. 1 is a schematic side section view of a drogue assembly in accordance with one embodiment of the present invention with retracted control flaps.

In FIG. 1, a drogue assembly in accordance with the invention is shown generally as 4. The drogue assembly comprises a reception coupling body 5, control flaps 6 and 7, a ducted ram air turbine (RAT) 8, a canopy (not shown, but see for example item 23 in FIG. 4) and a distal end 9 of a refuelling hose fed out from a tanker aircraft (not shown). The reception coupling body 5 is generally bullet shaped with a central longitudinal axis. A convex tapered leading end region 10 of the coupling body is connected to the end region of the refuelling hose 9. A rear portion of the coupling body has a central axial bore 3 which defines a central coupling chamber 11 with a flared frusto-conical end region 12 for receiving a refuelling probe (not shown). The reception coupling mechanism resides in the bore but is not shown in detail herein, but is of conventional configuration. A preferred arrangement is shown in U.S. Pat. No. 9,950,804 B2 (the contents of which are incorporated herein by reference). Once the drogue assembly 4 is coupled and latched to a refuelling probe of a receiver aircraft (not shown), fuel may flow from a tanker aircraft, through the refuelling hose 9 through the chamber defined by the bore 3 through the reception coupling body 5 and into the receiving aircraft via the probe engaged with the coupling. More detail of a suitable coupling and latching arrangement is given in EP-A-2986508 (Flight Refuelling Ltd., the contents of which are incorporated herein by reference).

A ram air turbine inlet duct 30 is a channel which feeds in an axial direction from the leading end region 10 to an internal ram air turbine unit 8 which includes a fan and rotor which drives an electrical generator (not shown). An exhaust duct 31 leads rearwardly from the turbine unit and vents out at the rear of the coupling body. Such ducted RATs are known in the art, so are not described in detail herein.

Figure 2:
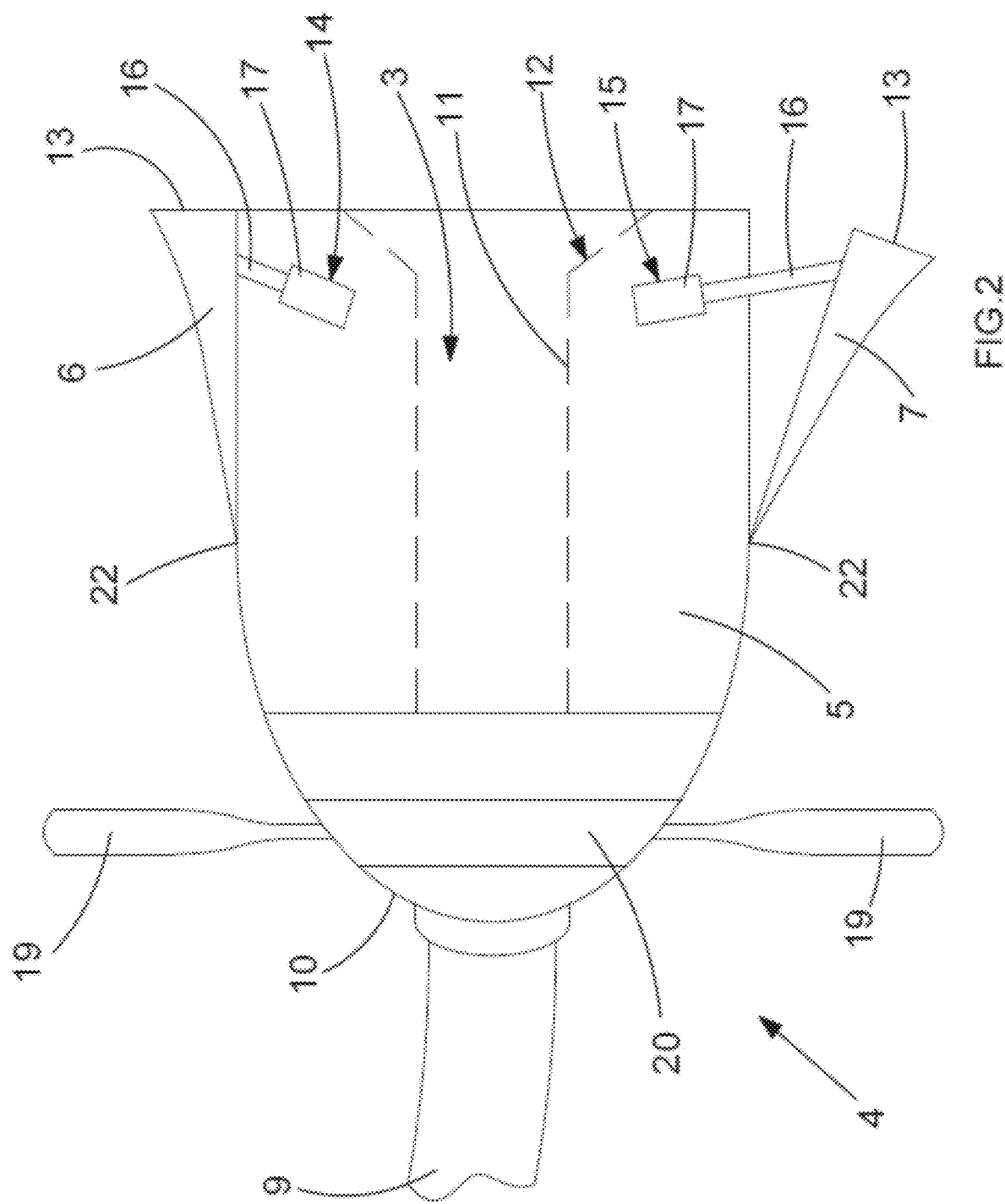
FIG. 2 is a schematic side section view of a drogue assembly in accordance with a second embodiment of the invention, with one deployed control flap and one retracted.
Figure 3:
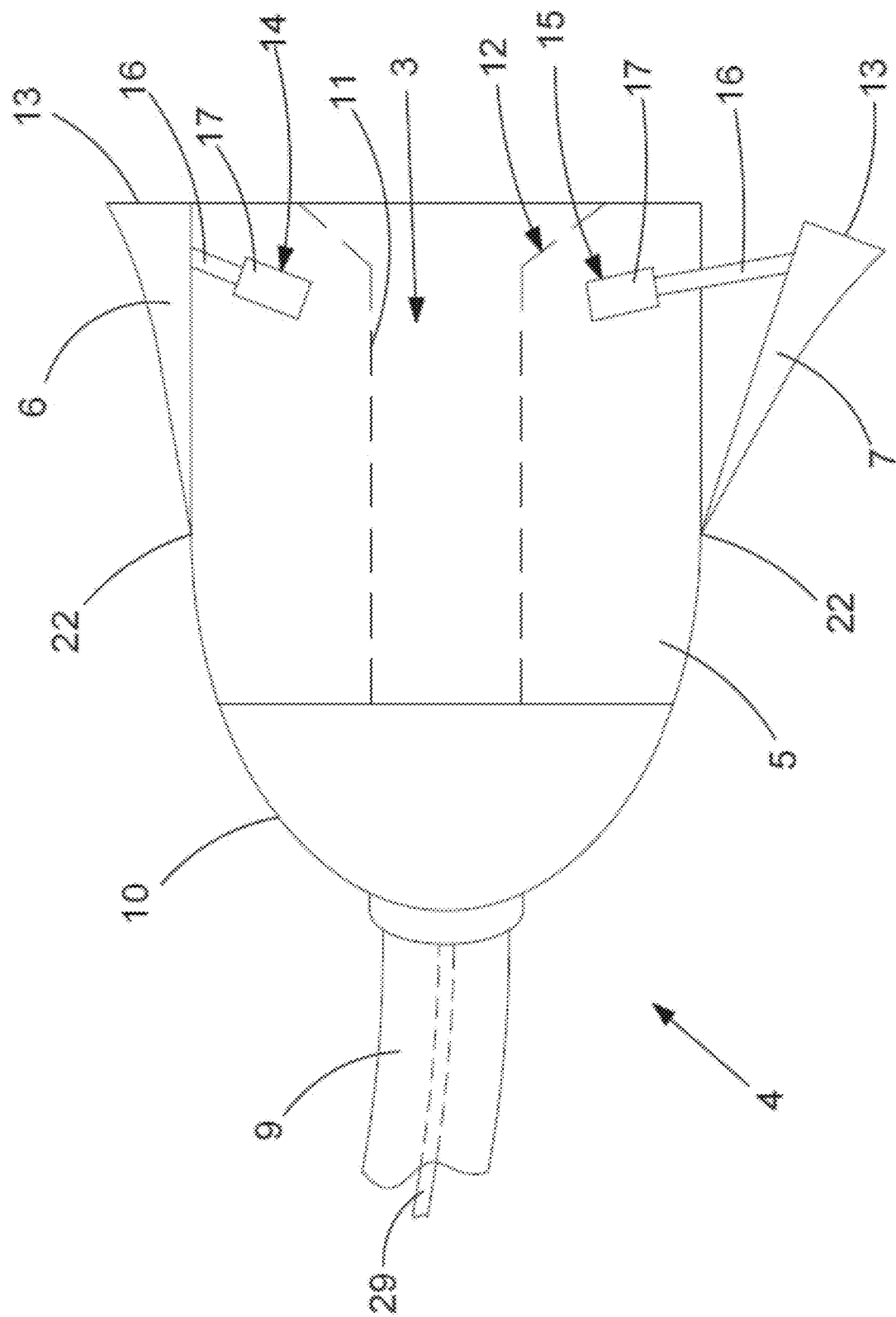
FIG. 3 is a schematic side section view of a drogue assembly in accordance with a third embodiment of the present invention.
Figure 4:
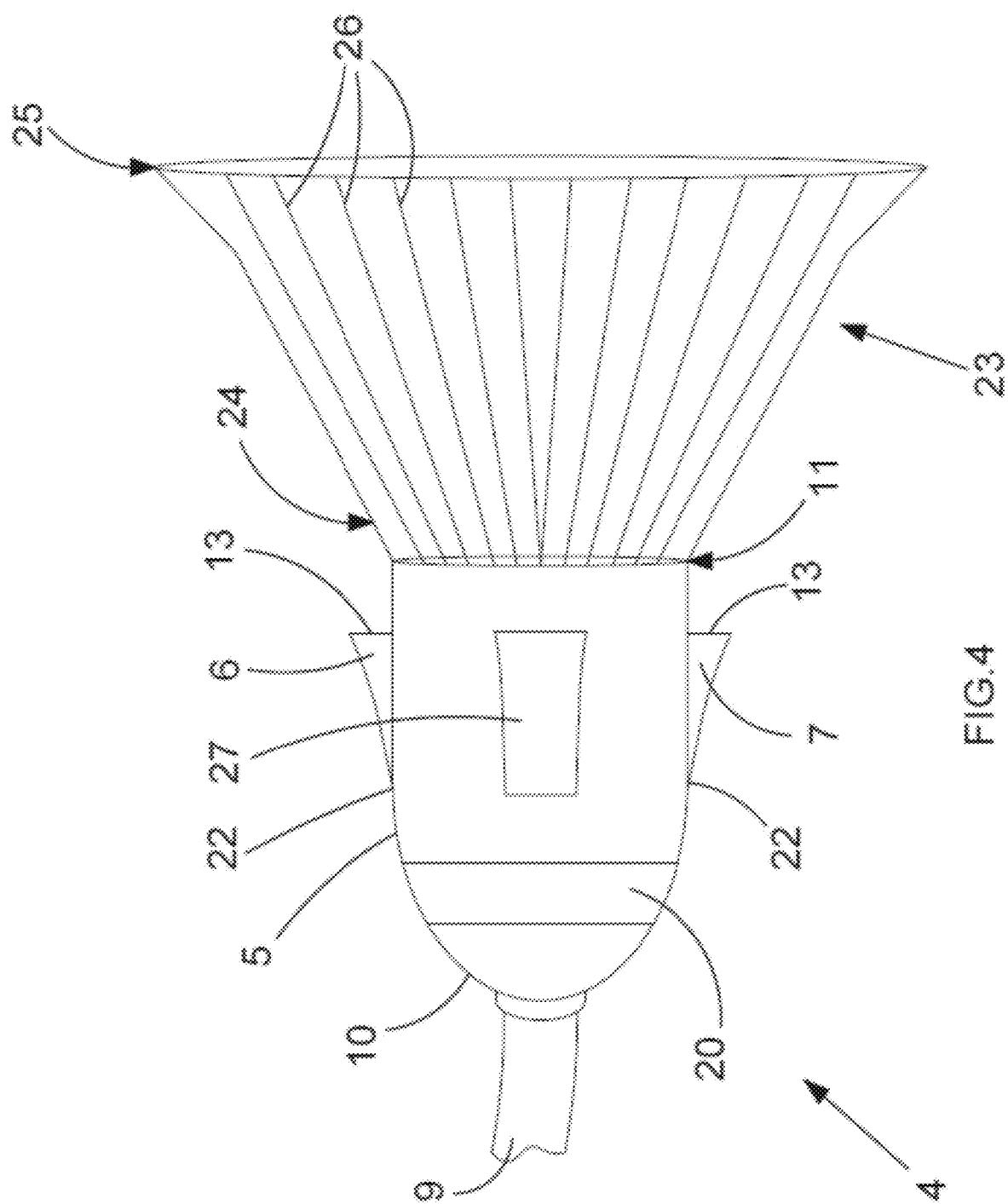
FIG. 4 is a schematic side view of a drogue assembly in accordance with a fourth embodiment of the invention.
Figure 5:
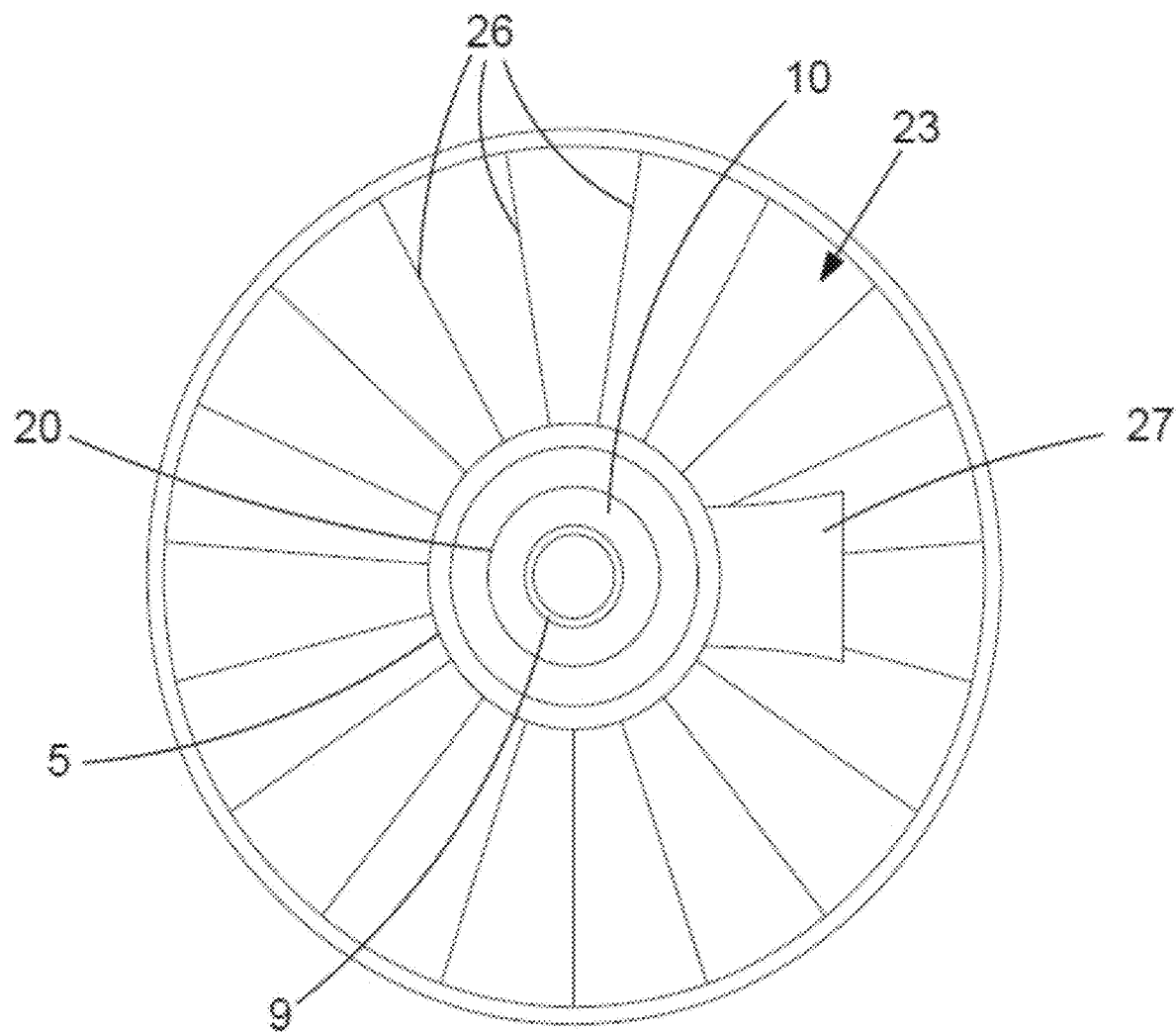
FIG. 5 is a schematic front view of the drogue assembly in accordance with the fourth embodiment of the present invention.

A generally frusto-conical drogue chute would usually be attached to the rear end of the reception body 5 and is not shown for the sake of simplicity in FIGS. 1 to 3 but can be seen in FIGS. 4 and 5 as item 23.

As shown in FIG. 1, the control flaps 6 and 7 are disposed in a diametrically opposed relationship. Each flap is wedge-shaped in profile with a slightly concave upper surface. Each wedge comprises a leading end 22 which is attached to an outer circumferential surface region of the coupling body 5 via a hinged joint (not shown). A trailing end 13 of the wedge flares outwards.

A pair of linear actuators 14 and 15 are inset into the coupling body 5 along inclined diametrically opposed radii. The actuators 14 and 15 may each be push rod solenoid actuators, wherein actuation is provided by extension of a rod 16 from a body portion 17. A distal end of each actuator rod 16 is attached to the trailing end 13 of each flap. As shown in FIG. 2, actuation of the rod 16 causes the flap 7 to deploy by pivoting radially outwards about its hinged leading edge 22, whereas the flap 6 remains retracted. For the towed drogue, actuation of a control flap locally increases the aerodynamic drag caused by the flap. This causes the drogue assembly to shift in the opposite radial direction, creating a steering effect. Where flaps are provided in diametrically opposed locations on the coupling body, the drogue assembly can be steered in either direction of the opposed directions. Similarly, if there are four circumferentially spaced flaps at say 0, 90, 180 and 270 degree locations the drogue assembly can be steered left and right or up and down. Combinations of flap deployment can be used to obtain diagonal movement. Alternative flap numbers and dispositions may be provided. For example in other embodiments there may be 6 or 8 flaps.

The flap actuation may be 'digital' in the sense that each actuator is either on (control signal=1) or off (control signal=0), so that the flap is either fully deployed or fully retracted. Alternatively the actuator may be moveable to one or more intermediate positions corresponding to positions in which the flaps are partially deployed. This has the advantage of permitting finer control of the control force and therefore drogue movement.

Having multiple individually deployable control flaps provides a range of control forces and directions by which to steer the drogue assembly 4 in a required direction. Any number and combination of deployed flaps may be used to steer the drogue assembly 4; more control flaps providing potentially greater steering accuracy. Each control flap is linked to a separate actuator to control deployment. As mentioned above, the control force may be varied by limiting the extent of deployment, with shallower deployment provided a reduced shifting force. Hence the actuators may provide for incremental deployment to a range of pivoted positions.

A remote-control system may be provided which communicates between controls provided in the tanker aircraft (or the receiver aircraft) and a microprocessor assembly (not shown) in the drogue assembly—typically in the coupling body. The microprocessor processes incoming control signals to actuate the desired flap or flaps, and by the required amount of deployment, to produce the intended drogue assembly lateral (X-Y) motion. Movement in the axial towing direction Z may be achieved by unspooling or retracting the hose, but this not usually adjusted during the docking and refuelling process. The drogue assembly may be manually steerable in X and Y directions. For example a joystick controller may be provided for providing control signals which move the drogue assembly in X-Y axes. Feedback may be provided to the control system by sensors (not shown) located within the drogue assembly 4. The sensors, such as accelerometers, may gather positional and orientational data which can be used to determine whether the desired movements have been made, and to correct the movement if necessary.

In order to provide power for the flap actuators (and any associated control circuitry), there may be provided a capacitor or cell or battery (not shown) in the coupling body. As shown in FIG. 1 the drogue is provided with a turbine generator, and in particular the ducted ram air turbine (RAT) 8 described above.

Rotation of the turbine blades fan by the ducted airflow causes an internal rotor to drive an electrical generator (not visible) which can be used to provide direct power to the actuators 14, 15 (and any control circuitry). Alternatively, the generator may be used to charge the electrical storage device such as the battery, cell or capacitor referred to above. This configuration eliminates the need for a separate power source and generates power by harvesting the airflow generated by trailing of the drogue.

Second Embodiment

This embodiment, shown in FIG. 2, corresponds generally with that of FIG. 1, but with an alternative ram air turbine arrangement. There is a twin-bladed diametrically opposed turbine 19 with a central axial generally annular mounting boss 20. A central bore (not shown) in the boss surrounds a fuel channel (not shown) fed by the hose 9. The boss drives an electrical generator, via appropriate gearing (not shown). The turbine 19 is located just aft of the leading end of the coupling body 5 where turbulent flow is best avoided and is driven by the high velocity airflow as the drogue assembly 4 is trailed behind the tanker aircraft (not shown).

As mentioned above, in FIG. 2 the flap 7 is shown in a deployed position, with the trailing edge pivoted out from the surface of the body about its leading edge hinge 22.

Third Embodiment

FIG. 3 shows an alternative embodiment in which the actuators and associated control circuitry are powered by a power cable 29 which is connected to the tanker aircraft within (or attached to) the fuel hose 9. The power cable may be connected to a battery in the tanker aircraft, or the tankers internal power supply system, or a generator (such as a RAT) provided in the aircraft, or in a refuelling pod attached thereto. The power cable 29 obviates the need for a generator on board the drogue assembly. An electrical storage device may still be present onboard the drogue assembly 4 which can be charged by the power cable, or may be omitted with power for the actuators coming directly via the cable 29. The power cable 29 enters the coupling body 5 through the proximal end 10 and feeds into the interior of the body so that it may be linked to the actuators (or to any battery or other storage device). In FIG. 3, one control flap 6 is shown in a retracted position and the second control flap 7 is shown in a deployed position.

Fourth Embodiment

Figure 6:
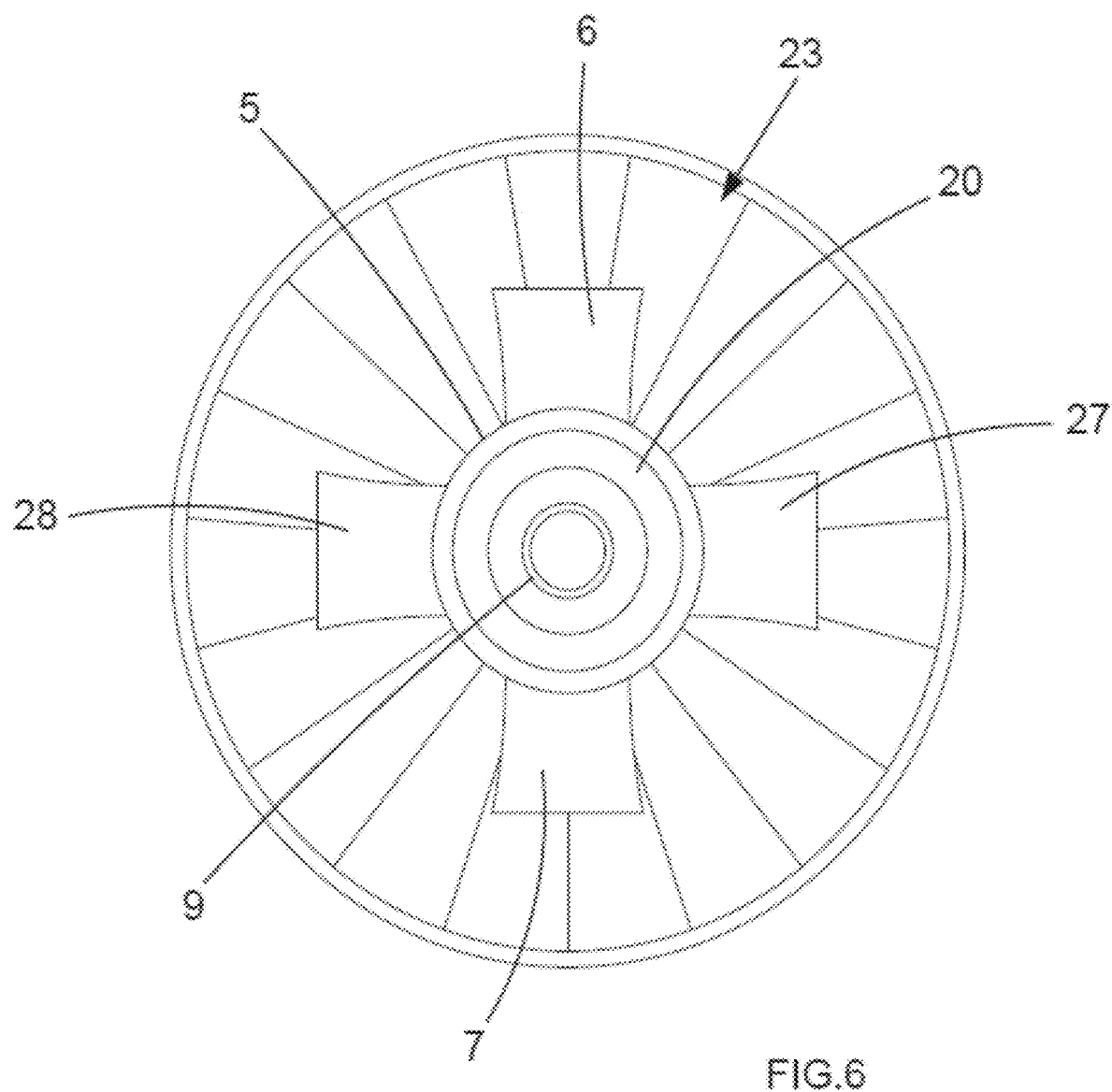
FIG. 6 is a further schematic front view of the drogue assembly in accordance with the fourth embodiment of the present invention.

A fourth embodiment of the invention is shown in FIGS. 4 to 6. This embodiment corresponds substantially to the first embodiment, with like features being given like numbering. In this embodiment the RAT comprises a double bladed turbine (not shown, but as configured in embodiment of FIG. 2) carried by an annular boss 20. In this embodiment the chute canopy 23 (that would also be present in the other embodiments) is now shown. The canopy has a generally frusto-conical form, with a leading end 24 attached to the circumferential edge of the drogue assembly rear end. A trailing end 25 of the canopy is generally annular in form, and is connected to the leading end by a plurality of support arms 26. The canopy is of conventional design and formed from web material which 'inflates' in the airflow to adopt a relatively rigid canopy shape.

This embodiment includes four control flaps 6, 7, 27 (and one hidden). FIG. 5 shows one flap 27 deployed and as is evident increases the cross-sectional area presented to the airflow in the region of the flap. FIG. 6 shows a front view of the drogue assembly in which the control flaps 6, 7, 27 and 28 are shown deployed and spaced around the surface of the drogue assembly body surface at 90 degrees separations.

Fifth Embodiment

Figure 7:
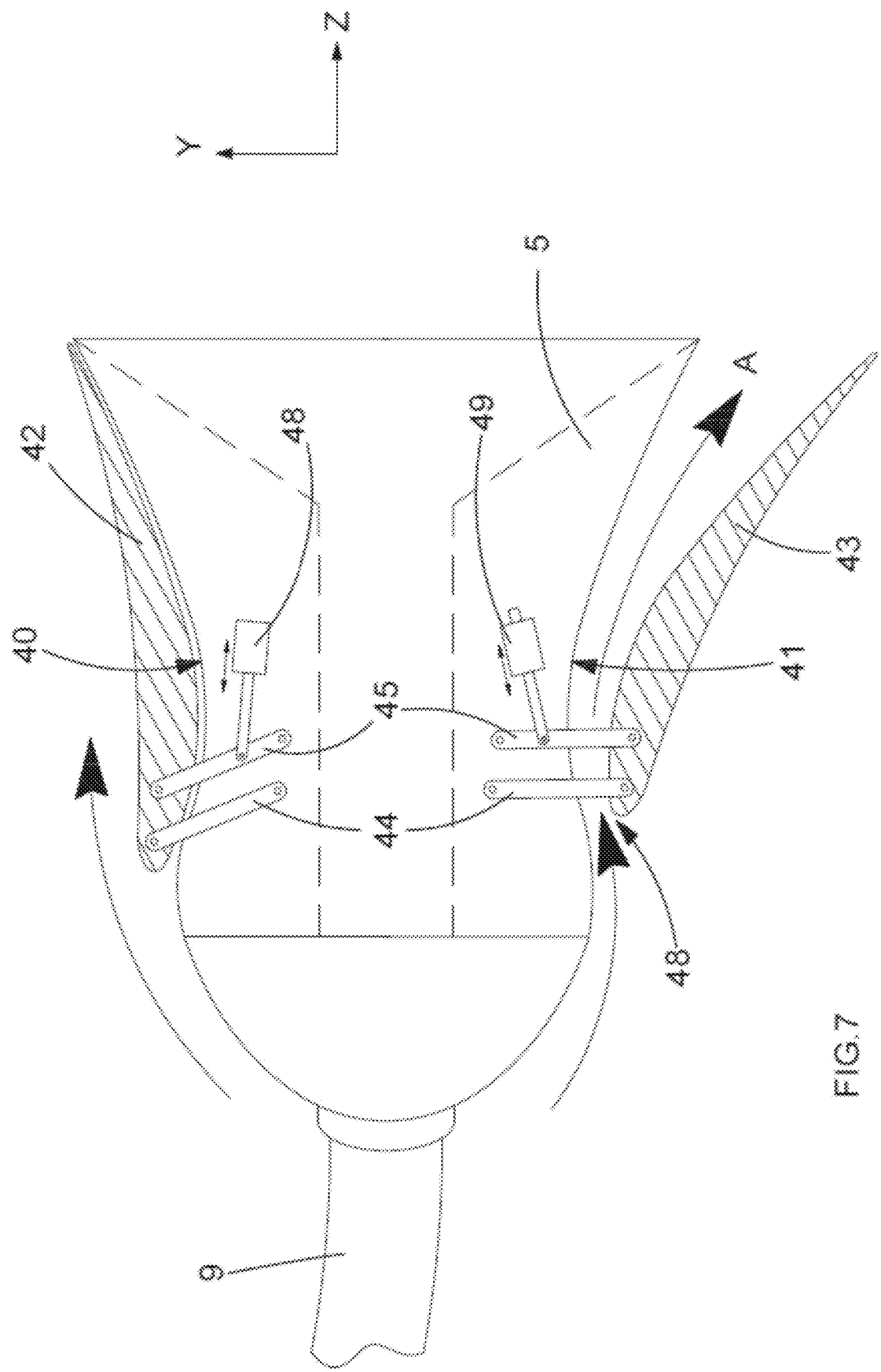
FIG. 7 is a schematic side view, partially in section of a drogue assembly in accordance with a fifth embodiment of the invention.

The fifth embodiment is shown in FIG. 7. The coupling body 5 has a waisted configuration in which the generally cylindrical shape is provided with concavely scooped outer surface profiles 40, 41. Two generally planar aerofoils 42,43 are accommodated in the respective outer surface scoops 40,41. Each aerofoil is attached to the coupling body by two generally parallel linkages 44, 45. Proximal end regions of these linkages are accommodated in axial slots (not shown) in the coupling body, with the respective pivots being axially spaced apart. Distal ends of the linkages are pivotally attached to each aerofoil. The distal pivots are disposed in a leading region 20) of each aerofoil and are longitudinally spaced apart from one another along the aerofoil. Thus each aerofoil can be moved (by linear actuators 48,49) on the linkages from the retracted position shown for the upper aerofoil 42 (in which the aerofoil is nested in the corresponding scoop 40) to a deployed position shown for the lower aerofoil 43 in which the aerofoil is displaced outwardly and rearwardly from the scoop 41. Under the constraint provided by the linkages the aerofoil rotates somewhat so that the trailing end of the aerofoil extends outwardly.

This displacement opens a slot 48 between the aerofoil 43 and the scoop 41, which provides a channel for laminar airflow (arrow A) over the scoop-facing side of the aerofoil. Concurrently the aerofoil's angle of attack increases so as to increase the lift provided by the aerofoil in the radial direction towards the coupling body. Thus a deployed aerofoil acts to shift the drogue assembly in a radial direction opposite to the deployment direction. In the figure the drogue would be shifted upwards in a Y direction. When the upper aerofoil is deployed and the lower one is retracted the lift generated by the upper aerofoil acts to shift the drogue downwards in negative Y direction.

The actuators can be shifted to partially deployed intermediate positions. For example, one aerofoil may be partially deployed, and the may be other fully deployed. The net reaction will be in the direction dictated by the fully deployed aerofoil. Deployment of both aerofoils may be desired to stabilise the drogue movement and/or to provide fine control of the net aerodynamic force generated and therefore fine control of shifting of the drogue. Although not visible in the figure, this embodiment would have two further diametrically opposed scoops and associated aerofoils so as to provide for control movements in the perpendicular X axis (out of the paper). Other configurations and multiples of aerofoils are of course possible.

Sixth Embodiment

Figure 8:
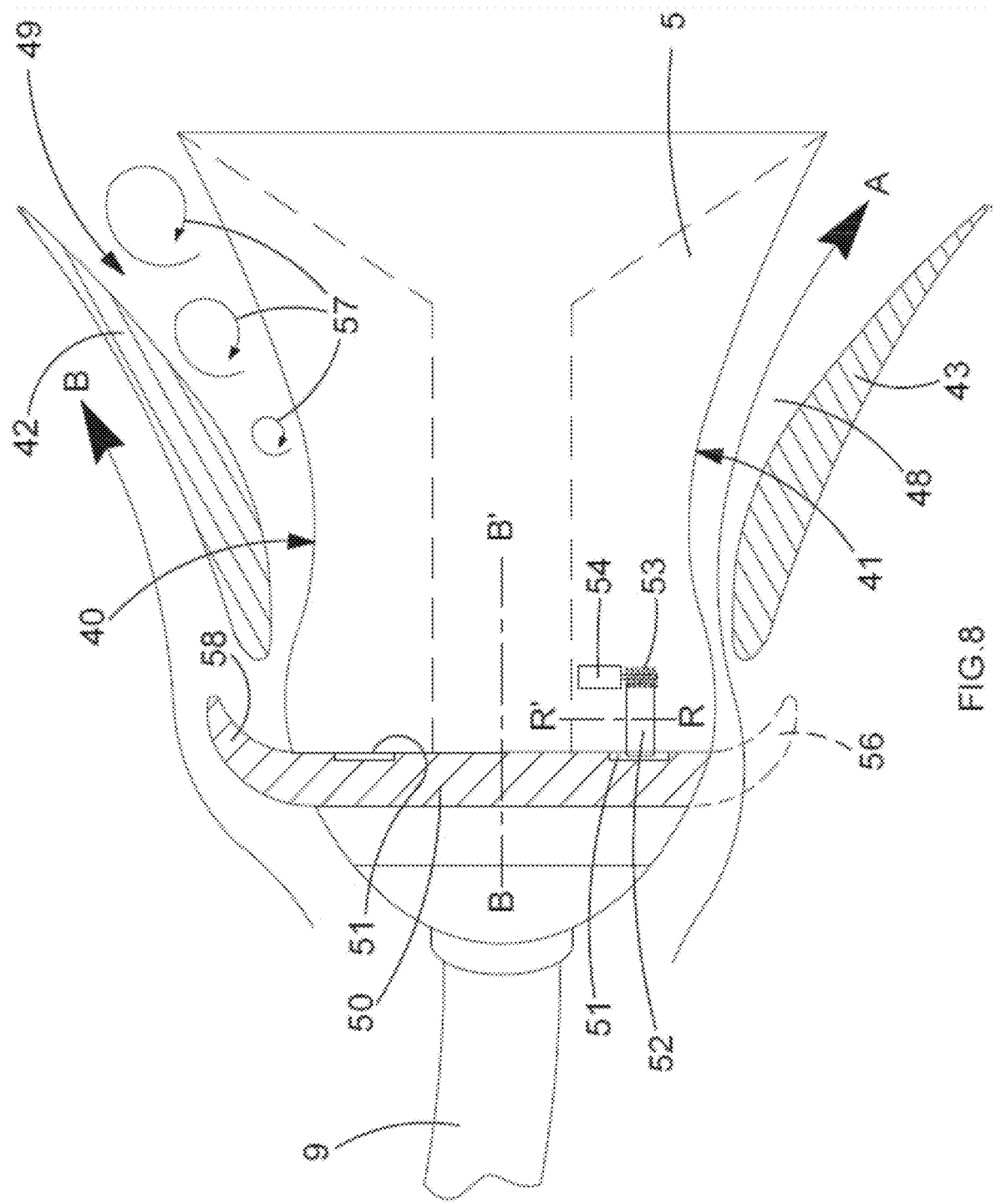
FIG. 8 is a schematic side view, partially in section of a drogue assembly in accordance with a sixth embodiment of the invention.

In a sixth embodiment of the invention shown in FIG. 8 the coupling body 5 has a similar waisted configuration to that of the fifth embodiment shown in FIG. 7. There are two generally planar aerofoils 42 and 43. Unlike the fifth embodiment, these aerofoils are fixed in position, with a duct space between the aerofoils' (42,43) respective inner surfaces and the facing scoops 40,41. An annular activation ring 50 is disposed forward of the aerofoils, in the nose region of the coupling body. The ring is adapted to rotate about the central axis B-B' of the drogue. An underside of the ring 50 is provided with a toothed surface ring feature 51. The toothed ring feature 51 is engaged by a toothed drive wheel 52 which rotates about axis R-R'. The drive wheel is engaged with a worm gear 53 of a rotating actuator 54. An outer edge region of the activation ring 50 is formed with a rearwardly curved lip 58 shown in FIG. 8. A diametrically opposite side of the ring is provided with a locally cut away region 56 (indicated by dashed lines). The cutaway region permits airflow (arrow A) to be ducted into the slot 48 between the aerofoil 43 and the waisted surface 41. This allows the aerofoil to generate lift in a radial (upwards in the figure) direction. The duct may be closed by activation of the actuator 54, which rotates the activation ring 50 until the locally cutaway region is rotated away from the aerofoil leading edge. The upper aerofoil has a duct 49 which is blocked by the lip 58. Thus airflow bypasses the duct 30) and flows over the outside of the aerofoil as indicated by the arrow B. As indicted by the eddies 57 in FIG. 8, the airflow in the duct is turbulent and no significant lift is generated by aerofoil 42 in the radial direction towards the central axis of the drogue.

To activate or invoke the upper duct 49 the actuator 54 is sent a control signal to activate and the drive wheel is turned so as to rotate the activation ring 50. The cutaway region simultaneously rotates away from the duct. The ring has several cutaway regions (not shown). Once of these cutaway regions moves to the front region of the aerofoil 42 so as to open the duct 49. Meanwhile the front region of the lower duct 48 becomes shrouded by the lip at the edge region thereof (in the position indicated by the dashed lines). The ring motion then stops and the duct 49 becomes operational, causing lift to be induced by the aerofoil in a radial direction (towards the central radial axis).

Although the aerofoils in this embodiment may be fixed in position (for the sake of simplicity and robustness), the aerofoils could be moveable, in whole or as a portion thereof, so as to permit stowage of the aerofoil by retraction, or so as to modify the lift characteristics, such as to provide fine control of the lift generated. So flaps or wing slots could be provided, or the entire aerofoil could be moved to increase or decrease lift, or maintain laminar flow.

Seventh Embodiment

Figure 9:
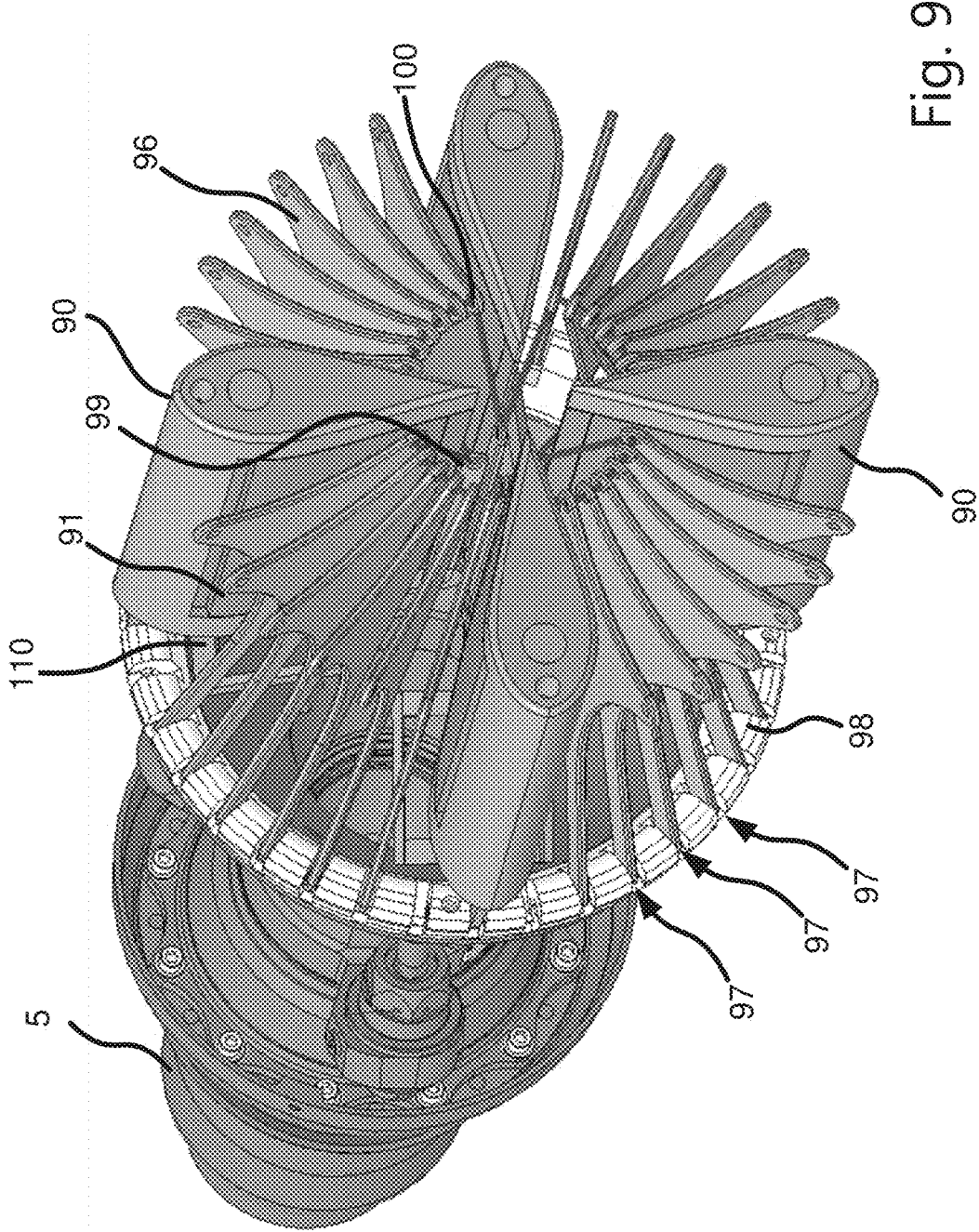
FIG. 9 is a partial view of an undeployed drogue assembly in accordance with a seventh embodiment of the invention.
Figure 12:
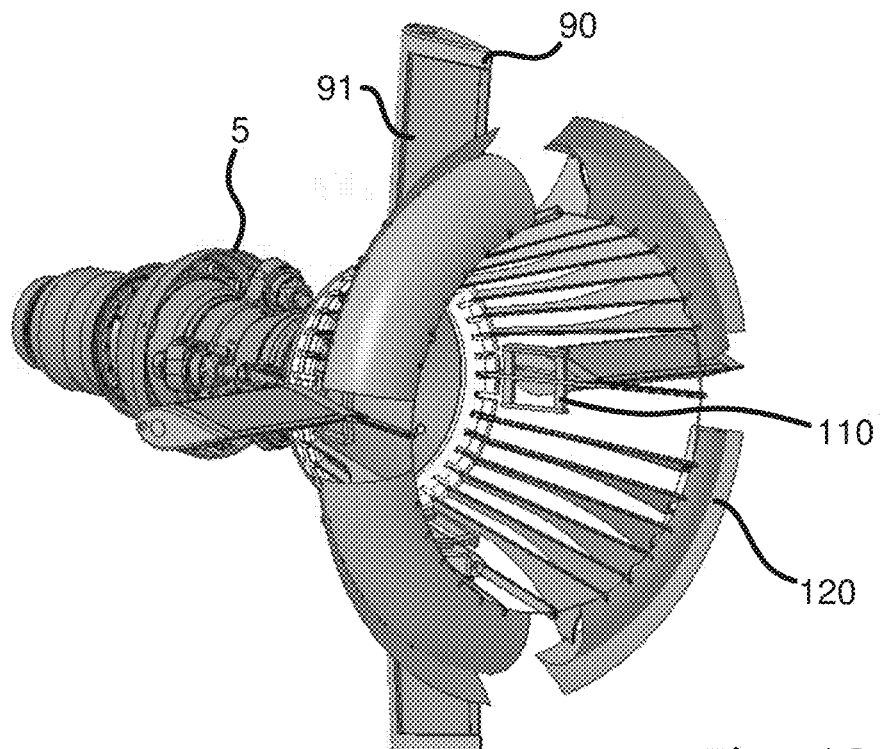
FIG. 12 is a partial view of a deployed drogue assembly showing the canopy.

A seventh embodiment of the invention is shown in FIG. 9. FIG. 9 shows a partial view of the prior to deployment and with the canopy not shown. FIG. 12 shows a coupling body 5 but also shows the canopy arrangement 120. The canopy itself is not shown in FIG. 9 but is provided at the ends of the series of strut like support arms 96. FIG. 9 shows the arrangement is its folded configuration as it would be when stowed prior to deployment and after it has been deployed and then retracted, i.e. when not deployed. The support arms 96 are attached to the canopy (not shown) to support the load generated by the canopy and transfer it to the reception coupling 5 and the rest of the drogue and hose assembly. The support arms may also provide a guide to aid directing the fuelling probe into the reception coupling. In use, the support arms tend to from a frusto-conical conical shape with the canopy at the base, forming a receiving "basket" into which the fuelling probe can be inserted to direct it into the reception coupling.

Arranged between some of the support arms are a number of wings 90 which are folded in and interleaved between the support arms so that they can be contained within a defined space for stowing when the drogue is not deployed. In the example shown in FIG. 9, four wings 90 are provided arranged around the central axis of the drogue.

Figure 10:
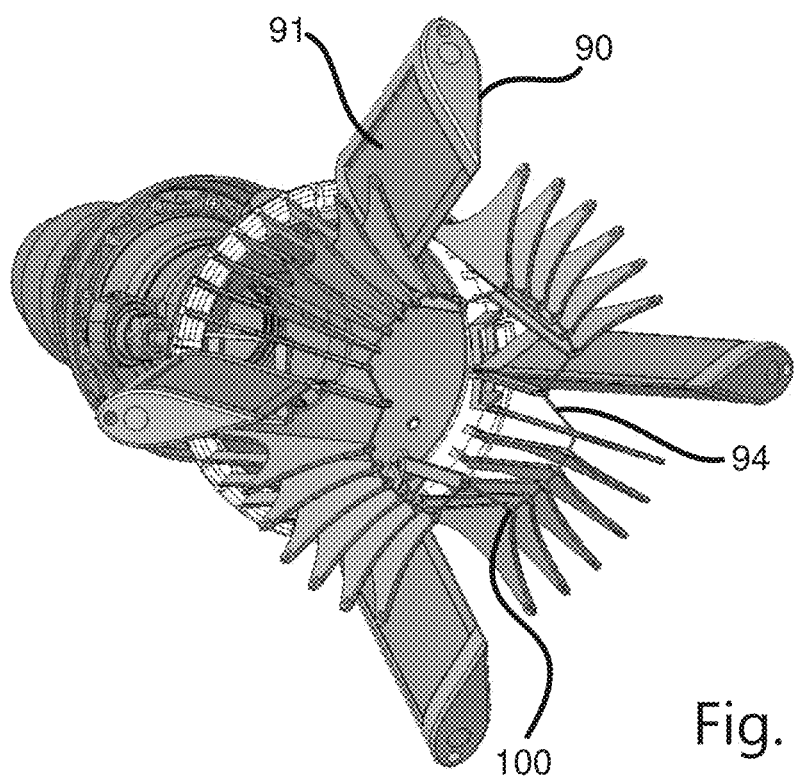
FIG. 10 is a partial view of a partially deployed drogue assembly.

Once the drogue is deployed, in use, the airflow engages the canopy which is attached to the support arms 96 at the ends where a through hole is shown. The airflow applies a force to the canopy which is resisted by the support arms. The support arms 96 are mounted to the coupling body 5 at pivot points 97 on a support ring 98. The load applied by the canopy acts on the ends of the support arms so that they pivot about the pivot points 97 causing them to fan out in a flower like manner. FIG. 10 shows the support ribs in their partially deployed state as they fan out. As the support arms continue to rotate, they eventually reach their fully deployed state, as shown in FIG. 11, showing the basket like structure mentioned above.

The support ribs have a through hole 100 arranged at an end away from the pivot point 97. A deployment cord 94 passes through each of them to form a continuous loop.

In the stowed position, as shown in FIG. 9, the wings 90 are generally interleaved between pairs of support arms. The wings 90 are also pivotably mounted on the support ring 98 so that they can be rotated so that they are inserted into the airflow around the drogue. The wings include a deployment arm 93 which is pivotably attached to the radially inner part of the base 110 of the wing. The other end of each deployment arm is provided with a through hole 99. The deployment cord 94 is passed through each of the holes 99. As shown in FIGS. 9 to 11, the cord 94 passes through the holes 100 and a series of adjacent support arms 96, then passes through the hole 20) 99 in the deployment arm 93 of one of the wings. Whilst the holes 100 lie in a generally circular path, as shown in FIG. 9, the holes 99 are generally axially offset, so that the cord extends generally axially from one hole 100 to go through the hole 99 before extending axially back in the opposite direction to pass through the next hole 100 generally on the circular path. With this arrangement, as the support arms start to deploy from the arrangement shown in FIG. 9, the holes 100 tend to move radially outward extending the diameter of the circular path along which the cord lies. The increasing diameter applies tension to the cord which applies a force to each of the deployment arms 93 generally axially compared to the drogue. This causes the deployment arms 93 to be pulled in an axial direction which in turn pulls on the radially inner part of the base 110 of the wing. This causes the base of the wing and hence the entire wing to rotate about the pivot and into the airflow.

Figure 11:
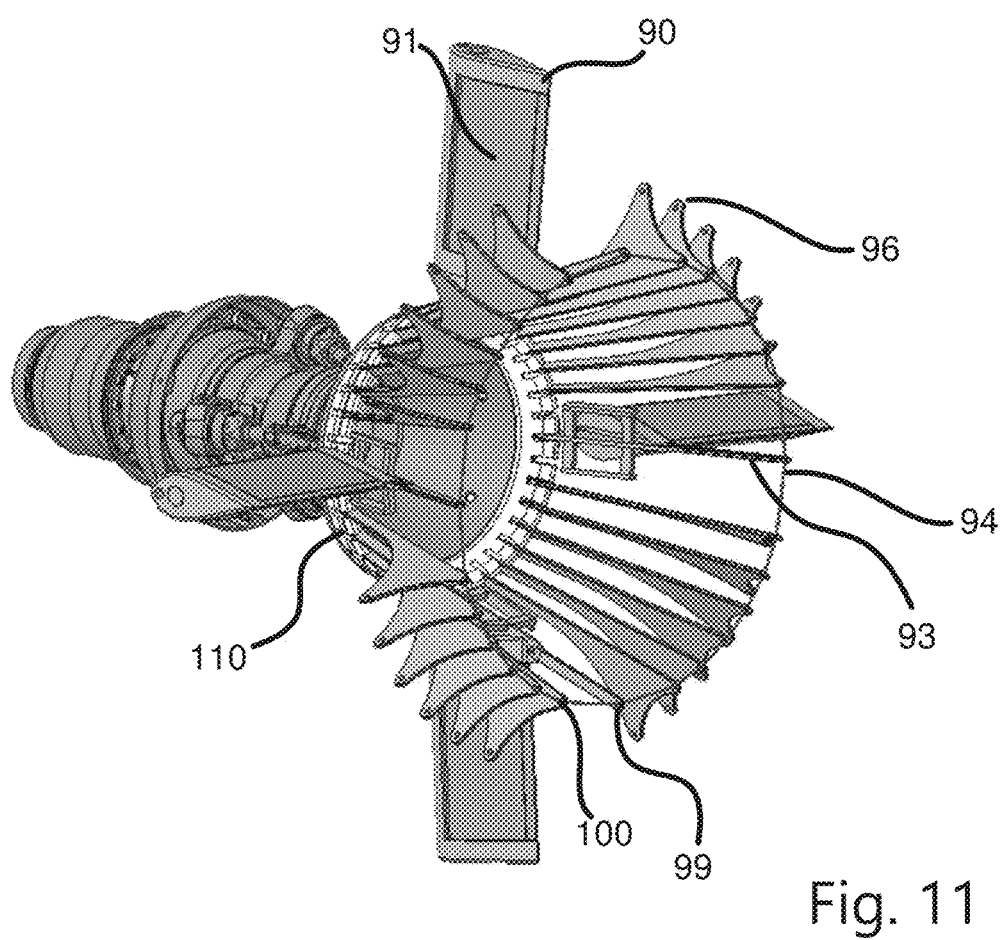
FIG. 11 is a partial view of a deployed drogue assembly.

As the support arms continue to move into their fully deployed state, the wings are moved into a corresponding deployed position as shown in FIG. 11. In this position, the holes 99 tend to be aligned with the generally circular path followed by the cord through the holes 100. The tension in the cord will tend to act to maintain the holes 99 aligned with holes 100 on the circular path and hold the wings in the deployed position. In the deployed position, the wings are preferably arranged so that their axes are generally perpendicular to the central axis of the drogue and coupling.

Figure 13:
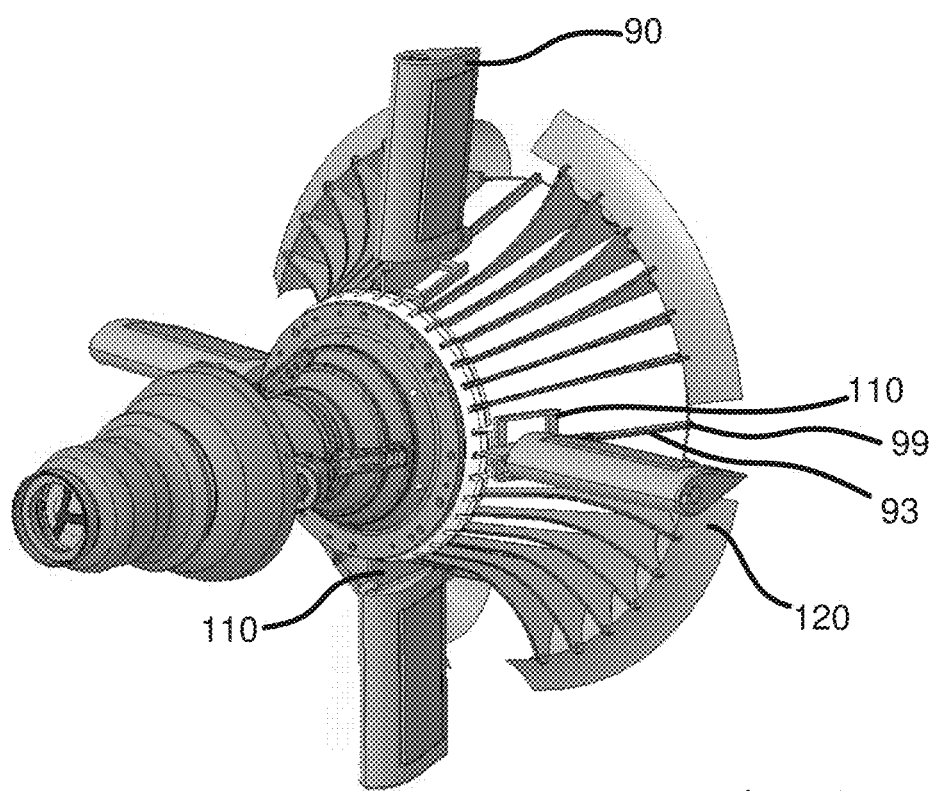
FIG. 13 is a partial view of a deployed drogue assembly with the canopy showing from a different direction to FIG. 12.

FIGS. 12 and 13 show views of the drogue in the fully deployed position with the canopy 120 showing. In this arrangement, the canopy is divided into four separate portions, as shown, to provide a space between the each of them to provide a clear path for airflow around each wing and between the canopies. This can also provide additional space for the wing to be deployed. However, the canopy may be formed in a complete circle, where this is more convenient.

Figures 14A, 14B:
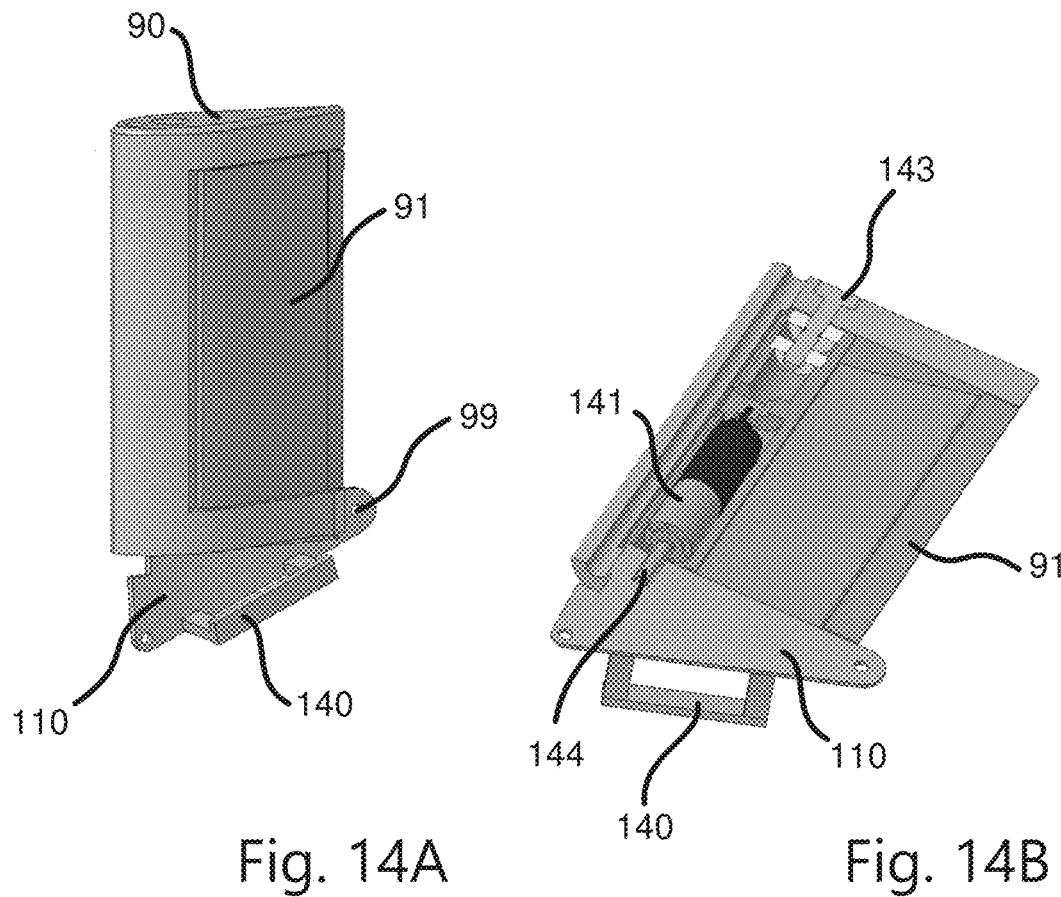
FIGS. 14A-14C show a wing in accordance with the seventh embodiment.
Figure 14C:
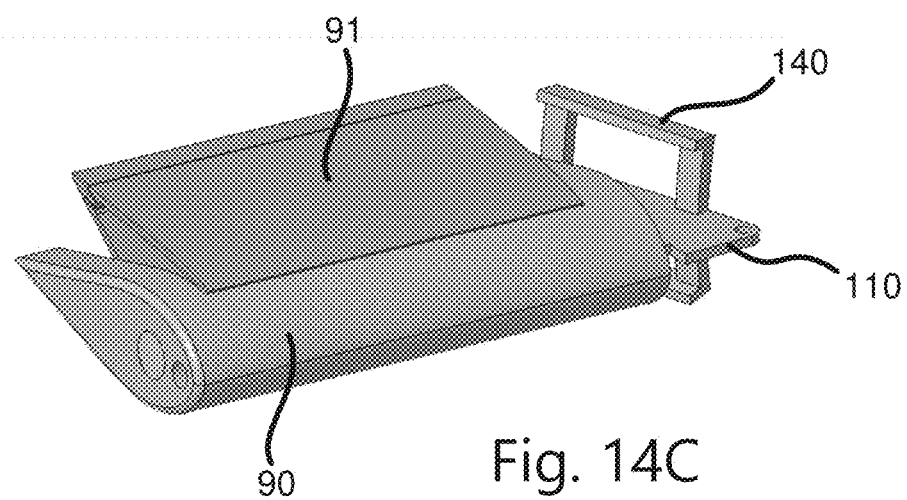

FIG. 14A shows the structure of one of the wings 90. As noted previously, the wing 90 is attached to a base portion 110 which is used to manipulate the wing into position. Built into the wing 90 is a flap 91 which is pivotable relative to the body of the wing as described below. The flap has a generally similar aerofoil shaped profile as the rest of the wing 90. As shown in FIGS. 14A and 14C, the wing and flap have a matching symmetrical aerofoil shape. However, they may alternatively be asymmetrical or provided with a degree of camber.

A fixed rib element 140 is attached to the base 110 which is positioned in the space between the neighbouring support arms 96, as shown in FIGS. 9 to 13. These occupy the space where the support arms would have been if the wing was not used. These rib elements 140 travel with the wing and act in tandem with the support arms to define the basket shape to guide the probe as it is received into the drogue.

FIG. 14B shows a cut away view of the wing 90. The flap is generally pivotally mounted in a position towards the leading edge, on upper 143 and lower 144 spindles. This allows the flap to be pivoted so that the trailing edge can project into the airflow on one or other side of the wing, as shown in FIG. 14C. An actuator 141 is provided within the body of the flap to provide a torque to deflect the flap one way or the other. The actuator is electrically operated by a cable (not shown) connected to a controller in the drogue body, drogue housing or on the aircraft. The actuator may alternatively be actuated hydraulically or pneumatically. The actuator may be position in the wing rather than the flap itself or even in the drogue body.

Figure 15A:
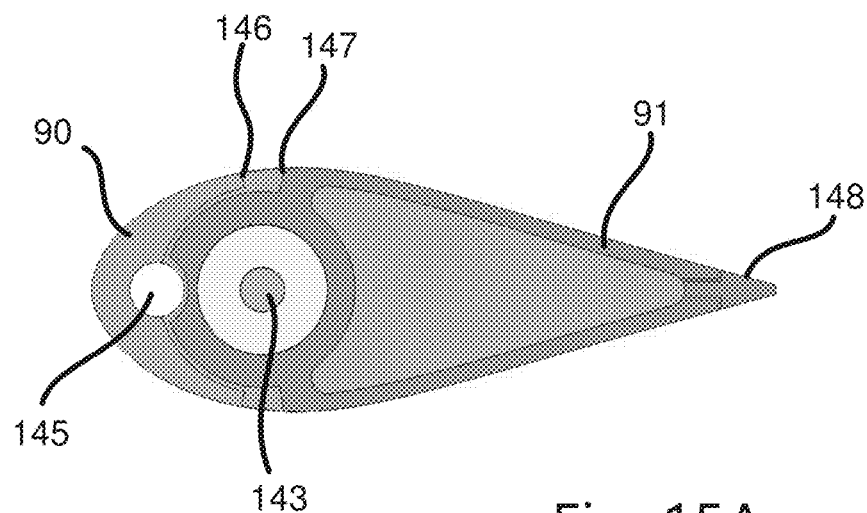
FIGS. 15A and 15B show a cross-section through a wing in different configurations.

FIG. 15A shows a cross section through a wing 90 showing the upper spindle 143. A channel 145 is also shown which allows for connection to the actuator 141 via a cable (not shown) to provide the electrical connection (or other e.g. hydraulic or pneumatic, services as appropriate).

Figure 15B:
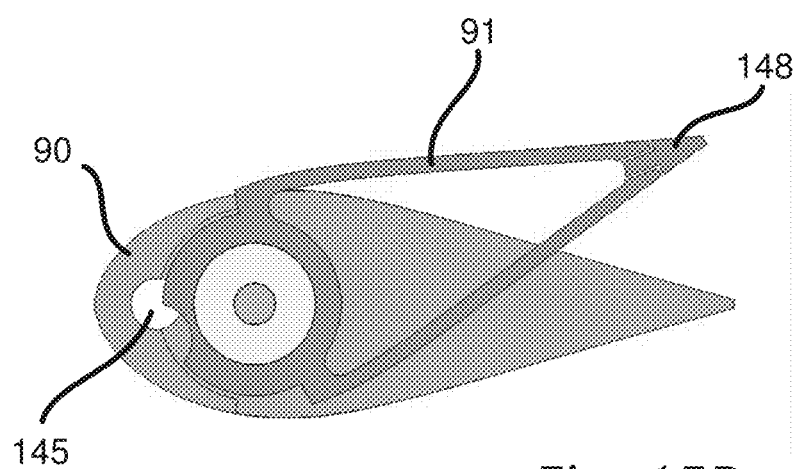

FIG. 15B shows the flap 91 in its displaced position. As shown, the flap may be hollow, for example to minimise weight but may be used to contain electronic controls and sensing circuitry. The cross section does not show it but the ends of the flap are preferably closed off. The trailing edge 148 of the flap is strengthened to resist the hostile environment it is placed in. The flap includes a stepped portion 147 which engages a corresponding stop 146 on the body of the wing to limit the travel of the flap relative to the wing within a defined range of angles (e.g. +/−20°).

In this embodiment, the canopy 120 is provided towards the trailing edge of the drogue. Once deployed the support arms form the generally frusto-conical shape of the basket. Web material may be provided between the support arms but not between the support arms either side of the wings and the wings, to allow the free movement of the wings into the deployed position.

In use, as the drogue is deployed from the carrier aircraft, e.g. a tanker aircraft, the drogue basket begins to "inflate" or open up from the arrangement shown in FIG. 9 to the arrangement shown in FIG. 11. As the drogue inflates, the wings are pivoted into place. As the wings rotate into position, they enter the airflow passing around the drogue. With wings having a symmetrical shape, like those shown in the figures and with the flaps in the neutral position as shown in FIG. 15A, the airflow passes around them without imparting any net force to the wing in a circumferential direction (although there will be a drag force in an axial direction). The wings therefore have a neutral effect on the drogue's position.

However, when the actuator 141 in one of the wings is operated to displace the flap 91, the flap enters into the airflow around the wing and generates a lift force on the wing in one direction. This force acts to produce a circumferential force on the drogue. By actuating the flaps on the wings on the top and bottom in the same direction, the net force causes the drogue to be displaced in one direction. Alternatively, by actuating the flaps on both the wings on the top and bottom in the opposite direction, then the drogue is displaced in the opposite direction. A similar effect can be used by manipulating the wings on the sides of the drogue to induce an upward or downward force.

Of course, combinations of forces can be used to displace the drogue left/right and up/down. By displacing flaps in opposite directions on opposite wings, a rotational force can be produced on the drogue. By arranging pairs of wings to generate such a torque in opposite directions, the net force and torque can cancel providing a drag force to move the drogue in a Z direction (as identified in FIG. 7).

The flap actuation may be done with a simple control so that the flap is either in its central neutral position, fully deployed in one direction or fully deployed in the other direction. The stepped portion 147 and stop 146 can assist with this. However, the actuator may be moveable to one or more intermediate positions corresponding to positions in which the flap is partially deployed. For example, the actuator may include a motor and gear box to allow fine adjustment of the position of the flaps. This has the advantage of permitting more accurate control of the control force and therefore drogue movement.

In the embodiment above, the drogue is provided with four wings angularly spaced around the periphery of the drogue but in other embodiments, other numbers can be used. For example, three angularly spaced wings can be used to generate movement up and down and left right. Similarly greater number of wings can be used to provide greater control over the drogue in three dimensions.

In the above embodiment, the flaps and wings are arranged so that they pivot about a radially extending axis perpendicular to the towing axis of the drogue assembly, i.e. in a direction parallel to a line extending radially from the axis of the drogue. However, the wings may be arranged in other orientations. For example, the wings may be arranged so that they are oriented parallel to a tangent of the drogue so that the flaps are pivoted along an axis parallel to a tangent of the drogue and perpendicular to the radial direction. In this way, the flaps move towards and away from the outer circumferential surface of the drogue to generate a force acting radially on the drogue.

In summary, the present invention relates to the field of aerial refuelling, usually by transfer of fuel from a tanker aircraft to a receiver aircraft. In particular the invention relates to a probe and drogue assembly arrangement in which the drogue assembly is steerable to facilitate engagement with the probe of the receiver aircraft. The invention provides a steerable drogue assembly for towing behind an aircraft, the drogue assembly comprising a reception coupling for receiving a probe of a receiver aircraft, one or more aerodynamic control features and one or more actuators provided in the drogue assembly and adapted to selectively activate said one or more control features, wherein the aerodynamic control features each have a generally planar aerodynamic control surface which is oriented either generally tangentially with respect to a towing axis of the drogue assembly or perpendicular to it, so that an activated control feature interacts with airflow passing the drogue so as to exert a control force on the drogue to control movement in a generally radial direction. The radial direction of the control force is generally towards the towing axis.

The invention claimed is:

1. A steerable drogue assembly for towing behind an aircraft, the steerable drogue assembly comprising:
   a reception coupling for receiving a probe of a receiver aircraft; and
   one or more aerodynamic control features and one or more actuators provided in the steerable drogue assembly and adapted to selectively activate said one or more aerodynamic control features, so that an activated aerodynamic control feature interacts with airflow passing the steerable drogue assembly so as to exert a control force on the steerable drogue assembly,
   wherein the aerodynamic control features include a wing member arranged to project radially from the steerable drogue assembly into the airflow passing the steerable drogue assembly, and
   wherein the steerable drogue assembly further comprises a receiving basket formed from a plurality of support arms arranged annularly around the central towing axis of the steerable drogue assembly, wherein the aerodynamic control features are moveable between a stowed position interleaved with the support arms and a deployed position projecting radially from the drogue into the airflow passing the steerable drogue assembly.

2. The steerable drogue assembly as claimed in claim 1 wherein each wing member includes a flap member, wherein the flap member is displaceable to vary an aerodynamic force on the steerable drogue assembly.

3. The steerable drogue assembly as claimed in claim 2 wherein each wing has a respective actuator for displacing said flap member.

4. The steerable drogue assembly as claimed in claim 2 wherein the flap member is arranged so that the aerodynamic force exerted on the steerable drogue assembly is in a direction perpendicular to a central towing axis of the steerable drogue assembly.

5. The steerable drogue assembly as claimed in claim 4 wherein the flap member is arranged with a pivot axis aligned with a radial direction of the steerable drogue assembly passing through the central towing axis of the steerable drogue assembly so that the aerodynamic force exerted on the steerable drogue assembly is in a direction parallel to a tangent of the surface of the steerable drogue assembly.

6. The steerable drogue assembly as claimed in claim 1 wherein the aerodynamic control features are pivotally mounted to the steerable drogue assembly at a first portion and have a second portion moveable between a first position corresponding to the stowed position and a second position corresponding to the deployed position of the aerodynamic control feature.

7. The steerable drogue assembly as claimed in claim 6 wherein each of the support arms have a pivot end such that the support arms are pivotable between a stowed position and a deployed position and wherein each of the support arms is provided with a free end separated from the pivot end wherein the free ends of the support arms and the second portions of the aerodynamic control features are connected to each other such that movement of the support arms causes corresponding movement of the aerodynamic control features.

8. The steerable drogue assembly as claimed in claim 7 wherein the support arms and aerodynamic control features are connected by a deployment cord connected to each of them.

9. The steerable drogue assembly as claimed in claim 1 wherein the aerodynamic control features each have a generally planar aerodynamic control surface which is oriented generally tangentially with respect to a central towing axis of the steerable drogue assembly, so that the control force exerted on the steerable drogue assembly is in a generally radial direction towards the central towing axis.

10. The steerable drogue assembly as claimed in claim 9 wherein the aerodynamic control features each comprise a control flap and an associated actuator which activates the control flap by moving the control flap from a retracted position to a deployed position in which the control flap projects into the airflow over the steerable drogue assembly so as to produce an aerodynamic force on the steerable drogue assembly which acts to shift the steerable drogue assembly laterally with respect to the central towing axis.

11. The steerable drogue assembly as claimed in claim 9 wherein the actuators are configured to move the control flaps to one or more intermediate positions between the retracted and fully deployed positions, whereby each control flap may be partially deployed in said one or more intermediate positions.

12. The steerable drogue assembly as claimed in claim 9 wherein each aerodynamic control surface is provided by a generally planar aerofoil member.

13. The steerable drogue assembly as claimed in claim 12 wherein the generally planar aerofoil member is oriented and configured to generate lift in a radial direction towards the central towing axis of the steerable drogue assembly.

14. The steerable drogue assembly as claimed in claim 12 wherein the generally planar aerofoil member when in an activated configuration defines an air duct between the generally planar aerofoil member and an outer surface portion of a drogue body of the steerable drogue assembly.

15. The steerable drogue assembly as claimed in claim 14 wherein the air duct comprises an inlet at a front region of the generally planar aerofoil member and an outlet at a rear region of the generally planar aerofoil member.

16. The steerable drogue assembly as claimed in claim 14 wherein an air duct blocking member is provided which is moveable between an open position in which the air duct is open for airflow therethrough and a closed position in which the air duct is closed.

17. The steerable drogue assembly as claimed in claim 16 wherein the air duct blocking member comprises an annular ring member provided with one or more blocking features which may be selectively rotated brought into alignment with the air duct so as to block airflow therethrough in the closed position and may be further rotated to permit airflow through the air duct in the open position.

18. The steerable drogue assembly as claimed in claim 17 wherein the ring member is coaxially disposed on or in the drogue body for selective rotation with respect to the drogue body.

19. The steerable drogue assembly as claimed in claim 16 wherein the air duct blocking member is associated with an actuator which serves to move the air duct blocking member between said positions.

20. The steerable drogue assembly as claimed in claim 16 wherein each generally planar aerofoil member is fixed with respect to the drogue body, with a spacing between the generally planar aerofoil member and the outer surface portion of the drogue body which defines the air duct.

21. The steerable drogue assembly as claimed in claim 12 wherein each generally planar aerofoil member is adapted to be moveable between a retracted position in which the generally planar aerofoil member is adjacent an outer surface portion of a drogue body of the steerable drogue assembly and a deployed activated position in which the generally planar aerofoil member is radially spaced apart from the outer surface portion with an airflow path thereby provided between the generally planar aerofoil member and the outer surface portion.

22. The steerable drogue assembly as claimed in claim 12 wherein an actuator operative between the generally planar aerofoil member and a drogue body of the steerable drogue assembly permits adjustment of an angle of attack of the generally planar aerofoil member, or adjustment of an elevator included in the generally planar aerofoil member.

23. The steerable drogue assembly as claimed in claim 22 wherein the actuator comprises a linkage which acts to increase the angle of attack as the generally planar aerofoil member moves from retracted to deployed positions.

24. The steerable drogue assembly as claimed in claim 12 wherein an actuator is associated with the generally planar aerofoil member for moving the generally planar aerofoil member from retracted to deployed positions.

25. An aerial refuelling tanker aircraft provided with a steerable drogue assembly in accordance with claim 1.

26. A hose and drogue refuelling system comprising a fuel hose and hose deployment mechanism and a steerable drogue assembly in accordance with claim 1, the system being housed in a pod to be fitted or retrofitted to an aircraft.

* * * * *